(12) United States Patent
Fang et al.

(10) Patent No.: US 7,870,903 B2
(45) Date of Patent: Jan. 18, 2011

(54) INVERSE EMULSION POLYMERS AS LOST CIRCULATION MATERIAL

(75) Inventors: Cindy C. Fang, College Station, TX (US); Carl J. Thaemlitz, Cypress, TX (US); Eric Davidson, Cults (GB)

(73) Assignee: Halliburton Energy Services Inc., Duncan, OK (US)

( * ) Notice: Subject to any disclaimer, the term of this patent is extended or adjusted under 35 U.S.C. 154(b) by 431 days.

(21) Appl. No.: 11/180,767

(22) Filed: Jul. 13, 2005

(65) Prior Publication Data

US 2007/0012447 A1 Jan. 18, 2007

(51) Int. Cl.
*E21B 33/13* (2006.01)
*E21B 43/16* (2006.01)

(52) U.S. Cl. .................. 166/292; 166/285; 166/295; 166/305.1

(58) Field of Classification Search ............. 166/285, 166/292, 293, 294, 295, 305.1
See application file for complete search history.

(56) References Cited

U.S. PATENT DOCUMENTS

| | | | |
|---|---|---|---|
| 2,649,160 A | 8/1953 | Williams et al. | |
| 2,848,051 A | 8/1958 | Williams | |
| 2,890,752 A | 6/1959 | Crone et al. | |
| 3,132,693 A | 5/1964 | Weisend | |
| 3,202,214 A | 8/1965 | McLaughlin | |
| 3,215,634 A | 11/1965 | Walker | |
| 3,247,171 A | 4/1966 | Walker et al. | |
| 3,284,393 A * | 11/1966 | Vanderhoff et al. | ......... 524/801 |
| 3,302,717 A | 2/1967 | West et al. | |
| 3,306,870 A | 2/1967 | Eilers et al. | |
| 3,375,872 A | 4/1968 | McLaughlin et al. | |
| 3,376,926 A | 4/1968 | McLaughlin et al. | |
| 3,447,608 A | 6/1969 | Fry et al. | |
| 3,448,800 A | 6/1969 | Parker et al. | |
| 3,464,494 A | 9/1969 | McLaughlin | |
| 3,493,529 A | 2/1970 | Krottinger et al. | |
| 3,556,221 A | 1/1971 | Haws et al. | |
| 3,721,295 A | 3/1973 | Bott | |
| 3,724,547 A | 4/1973 | Bott | |
| 3,818,998 A | 6/1974 | Hessert | |
| 3,893,510 A | 7/1975 | Elphingstone et al. | |
| 3,918,523 A | 11/1975 | Stuber | |
| 3,953,336 A | 4/1976 | Daigle | |
| 3,959,003 A | 5/1976 | Ostroot et al. | |
| 4,034,809 A | 7/1977 | Phillips et al. | |
| 4,069,062 A | 1/1978 | Bürge | |
| 4,083,407 A | 4/1978 | Griffin, Jr. et al. | |
| 4,120,361 A | 10/1978 | Threlkeld et al. | |
| 4,172,066 A | 10/1979 | Zweigle et al. | |
| 4,182,417 A | 1/1980 | McDonald et al. | |
| 4,191,254 A | 3/1980 | Baughman et al. | |
| 4,202,413 A | 5/1980 | Messenger | |
| 4,205,611 A | 6/1980 | Slawinski | |
| 4,235,291 A | 11/1980 | Messenger | |
| 4,248,304 A | 2/1981 | Phillips | |
| 4,276,935 A | 7/1981 | Hessert et al. | |
| 4,282,928 A * | 8/1981 | McDonald et al. | .......... 166/268 |
| 4,299,710 A | 11/1981 | Dupre et al. | |
| 4,304,298 A | 12/1981 | Sutton | |
| 4,340,427 A | 7/1982 | Sutton | |
| 4,367,093 A | 1/1983 | Burkhalter et al. | |
| 4,391,925 A | 7/1983 | Mintz et al. | |
| 4,450,010 A | 5/1984 | Burkhalter et al. | |
| 4,463,808 A | 8/1984 | Mason et al. | |
| 4,466,831 A | 8/1984 | Murphey | |
| 4,478,640 A | 10/1984 | Holland | |
| 4,487,864 A | 12/1984 | Bermudez et al. | |
| 4,507,154 A | 3/1985 | Burge et al. | |
| 4,515,216 A | 5/1985 | Childs et al. | |
| 4,565,578 A | 1/1986 | Sutton et al. | |
| 4,572,295 A | 2/1986 | Walley | |
| 4,579,668 A | 4/1986 | Messenger | |
| 4,588,031 A | 5/1986 | Oliver, Jr. et al. | |
| 4,635,726 A * | 1/1987 | Walker | ....................... 166/294 |
| 4,646,834 A | 3/1987 | Bannister | |
| 4,664,816 A | 5/1987 | Walker | |
| 4,670,501 A | 6/1987 | Dymond et al. | |
| 4,690,996 A | 9/1987 | Shih et al. | ................... 524/312 |

(Continued)

FOREIGN PATENT DOCUMENTS

CN 1999 9 2/1999

(Continued)

OTHER PUBLICATIONS

Foreign communication from a related counterpart application dated Oct. 12, 2006.

(Continued)

*Primary Examiner*—Zakiya W Bates
*Assistant Examiner*—Angela M Ditrani
(74) *Attorney, Agent, or Firm*—Craig W. Roddy; Conley Rose, P.C.

(57) ABSTRACT

A sealant composition comprising an inverse emulsion polymer and methods of servicing a wellbore using the same are disclosed. In one embodiment, a method of servicing a wellbore that penetrates a subterranean formation is disclosed. The method comprises placing a sealant composition comprising an inverse emulsion polymer into the wellbore to reduce a loss of fluid to the subterranean formation during placement of the fluid in the wellbore.

13 Claims, 3 Drawing Sheets

U.S. PATENT DOCUMENTS

| | | | |
|---|---|---|---|
| 4,704,213 A | 11/1987 | Delhommer et al. | |
| 4,706,755 A | 11/1987 | Roark et al. | |
| 4,724,906 A | 2/1988 | Sydansk | |
| 4,730,674 A | 3/1988 | Burdge et al. | |
| 4,777,200 A | 10/1988 | Dymond et al. | |
| 4,818,288 A | 4/1989 | Aignesberger et al. | |
| 4,836,940 A | 6/1989 | Alexander | |
| 4,886,550 A | 12/1989 | Alexander | |
| 4,896,724 A | 1/1990 | Hazlett et al. | |
| 4,899,819 A | 2/1990 | Hazlett et al. | |
| 4,941,533 A | 7/1990 | Buller et al. | |
| 4,961,760 A | 10/1990 | Caskey et al. | |
| 4,961,790 A | 10/1990 | Smith et al. | |
| 4,964,918 A | 10/1990 | Brown et al. | |
| 4,989,673 A | 2/1991 | Sydansk | |
| 5,002,127 A | 3/1991 | Dalrymple et al. | |
| 5,034,139 A * | 7/1991 | Reid et al. | 507/119 |
| 5,078,212 A | 1/1992 | Boyle et al. | |
| 5,086,841 A | 2/1992 | Reid et al. | |
| 5,089,538 A | 2/1992 | Iizuka et al. | |
| 5,106,516 A | 4/1992 | Mueller et al. | |
| 5,120,367 A | 6/1992 | Smith et al. | |
| 5,145,012 A | 9/1992 | Hutchins et al. | |
| 5,232,910 A | 8/1993 | Mueller et al. | |
| 5,252,554 A | 10/1993 | Mueller et al. | |
| 5,318,954 A | 6/1994 | Mueller et al. | |
| 5,346,012 A | 9/1994 | Heathman et al. | |
| 5,351,759 A | 10/1994 | Nahm et al. | |
| 5,385,206 A | 1/1995 | Thomas | |
| 5,421,410 A | 6/1995 | Irani | |
| 5,439,057 A | 8/1995 | Weaver et al. | |
| 5,447,197 A | 9/1995 | Rae et al. | |
| 5,465,792 A | 11/1995 | Dawson et al. | |
| 5,476,142 A | 12/1995 | Kajita | |
| 5,512,096 A | 4/1996 | Krause | |
| 5,547,506 A | 8/1996 | Rae et al. | |
| 5,550,189 A | 8/1996 | Qin et al. | |
| 5,588,488 A | 12/1996 | Vijn et al. | |
| 5,591,701 A | 1/1997 | Thomas | |
| 5,707,443 A | 1/1998 | Brown et al. | |
| 5,718,292 A | 2/1998 | Heathman et al. | |
| 5,735,349 A | 4/1998 | Dawson et al. | |
| RE36,066 E | 1/1999 | Mueller et al. | |
| 5,881,826 A | 3/1999 | Brookey | |
| 5,913,364 A | 6/1999 | Sweatman | |
| 5,921,319 A | 7/1999 | Curtice | |
| 6,060,434 A | 5/2000 | Sweatman et al. | |
| 6,123,159 A | 9/2000 | Brookey et al. | |
| 6,148,917 A | 11/2000 | Brookey et al. | |
| 6,156,708 A | 12/2000 | Brookey et al. | |
| 6,167,967 B1 | 1/2001 | Sweatman | |
| 6,169,058 B1 * | 1/2001 | Le et al. | 507/222 |
| 6,187,839 B1 * | 2/2001 | Eoff et al. | 523/130 |
| 6,218,343 B1 | 4/2001 | Burts, Jr. | |
| 6,258,757 B1 | 7/2001 | Sweatman et al. | |
| 6,390,208 B1 | 5/2002 | Brookey | |
| 6,405,801 B1 | 6/2002 | Vijn et al. | |
| 6,431,282 B1 | 8/2002 | Bosma et al. | |
| 6,457,523 B1 | 10/2002 | Vijn et al. | |
| 6,460,632 B1 | 10/2002 | Chatterji et al. | |
| 6,465,397 B1 | 10/2002 | Patterson | |
| 6,508,306 B1 | 1/2003 | Reddy et al. | |
| 6,516,881 B2 | 2/2003 | Hailey, Jr. | |
| 6,516,882 B2 | 2/2003 | McGregor et al. | |
| 6,518,224 B2 | 2/2003 | Wood | |
| 6,533,038 B2 | 3/2003 | Venning et al. | |
| 6,554,081 B1 | 4/2003 | Brooks et al. | |
| 6,561,269 B1 | 5/2003 | Brown et al. | |
| 6,581,701 B2 | 6/2003 | Heying | |
| 6,610,140 B2 | 8/2003 | Vijn et al. | |
| 6,616,753 B2 | 9/2003 | Reddy et al. | |
| 6,626,992 B2 | 9/2003 | Vijn et al. | |
| 6,631,766 B2 | 10/2003 | Brothers et al. | |
| 6,655,475 B1 | 12/2003 | Wald | |
| 6,702,044 B2 | 3/2004 | Reddy et al. | |
| 6,708,760 B1 | 3/2004 | Chatterji et al. | |
| 6,715,553 B2 | 4/2004 | Reddy et al. | |
| 6,716,797 B2 | 4/2004 | Brookey | |
| 6,722,433 B2 | 4/2004 | Brothers et al. | |
| 6,722,434 B2 | 4/2004 | Reddy et al. | |
| 6,730,636 B2 | 5/2004 | Vijn et al. | |
| 6,767,867 B2 | 7/2004 | Chatterji et al. | |
| 6,770,601 B1 | 8/2004 | Brookey | |
| 6,777,377 B2 * | 8/2004 | Myers et al. | 507/120 |
| 6,800,593 B2 | 10/2004 | Dobson, Jr. et al. | |
| 6,858,566 B1 | 2/2005 | Reddy et al. | |
| 6,887,832 B2 | 5/2005 | Kirsner et al. | |
| 7,156,174 B2 | 1/2007 | Roddy et al. | |
| 7,204,312 B2 | 4/2007 | Roddy et al. | |
| 2001/0018975 A1 | 9/2001 | Richardson | |
| 2002/0040812 A1 | 4/2002 | Heying | |
| 2002/0170717 A1 | 11/2002 | Venning et al. | |
| 2002/0188040 A1 | 12/2002 | Chen et al. | |
| 2003/0008779 A1 | 1/2003 | Chen et al. | |
| 2003/0062170 A1 | 4/2003 | Slack | |
| 2003/0066651 A1 | 4/2003 | Johnson | |
| 2003/0075315 A1 | 4/2003 | Nguyen et al. | |
| 2003/0092582 A1 | 5/2003 | Reddy et al. | |
| 2003/0144153 A1 | 7/2003 | Kirsner et al. | |
| 2003/0181338 A1 | 9/2003 | Sweatman et al. | |
| 2003/0186819 A1 | 10/2003 | Sweatman | |
| 2003/0201103 A1 | 10/2003 | Brookey et al. | |
| 2004/0069537 A1 | 4/2004 | Reddy et al. | |
| 2004/0069538 A1 | 4/2004 | Reddy et al. | |
| 2004/0108141 A1 | 6/2004 | Reddy et al. | |
| 2004/0168798 A1 | 9/2004 | Creel et al. | |
| 2004/0168801 A1 | 9/2004 | Reddy et al. | |
| 2004/0168802 A1 | 9/2004 | Creel et al. | |
| 2004/0168804 A1 | 9/2004 | Reddy et al. | |
| 2004/0168830 A1 | 9/2004 | Reddy et al. | |
| 2004/0171499 A1 | 9/2004 | Ravi et al. | |
| 2004/0180794 A1 | 9/2004 | Reddy et al. | |
| 2004/0221990 A1 | 11/2004 | Heathman et al. | |
| 2004/0221991 A1 | 11/2004 | Brothers et al. | |
| 2005/0009710 A1 | 1/2005 | Heathman et al. | |
| 2005/0032652 A1 | 2/2005 | Kirsner et al. | |
| 2005/0051363 A1 | 3/2005 | Munoz, Jr. et al. | |
| 2005/0061505 A1 | 3/2005 | Caveny et al. | |
| 2005/0098317 A1 | 5/2005 | Reddy et al. | |
| 2005/0113260 A1 | 5/2005 | Wood | |
| 2005/0113262 A1 | 5/2005 | Ravi et al. | |
| 2005/0124502 A1 | 6/2005 | Shaarpour | |
| 2005/0199401 A1 | 9/2005 | Patel et al. | |
| 2006/0211580 A1 | 9/2006 | Wang et al. | |
| 2006/0213662 A1 | 9/2006 | Creel et al. | |

FOREIGN PATENT DOCUMENTS

| | | |
|---|---|---|
| CN | 1348932 | 5/2002 |
| CN | 1364739 | 8/2002 |
| CN | 2003 6 | 6/2003 |
| DE | 21 77 96 | 1/1985 |
| DE | 217796 | 1/1985 |
| DE | 100 37 118 A1 | 7/2000 |
| EP | 0530768 A1 | 3/1993 |
| EP | 0 401 936 B1 | 10/1994 |
| EP | 1 188 726 A2 | 9/2001 |
| EP | 1 316 540 A2 | 6/2003 |
| EP | 0 566 118 B2 | 10/2004 |
| GB | 2271350 A | 4/1994 |
| GB | 2325949 A | 12/1998 |
| GB | 2 371 319 A | 7/2002 |
| JP | 53062308 A | 6/1978 |
| JP | 60235863 | 11/1985 |

| | | | |
|---|---|---|---|
| JP | 559886 A | 3/1993 | |
| JP | 10088508 A | 4/1998 | |
| JP | 200272943 A | 3/1999 | |
| JP | 2001048627 A | 8/1999 | |
| JP | 2001146457 A | 5/2001 | |
| RU | 2 177 539 | 10/1999 | |
| RU | 2160822 C2 | 12/2000 | |
| SU | 953187 A | 8/1982 | |
| SU | 1723312 | 3/1992 | |
| WO | WO 84/01943 | 5/1984 | |
| WO | 9916723 A1 | 4/1999 | |
| WO | 0174967 A1 | 10/2001 | |
| WO | WO 02/084070 A1 | 10/2002 | |
| WO | WO 2004/101463 A2 | 11/2004 | |
| WO | WO 2004/101463 A3 | 11/2004 | |
| WO | WO 2004/101951 A1 | 11/2004 | |
| WO | WO 2004/101952 A1 | 11/2004 | |

OTHER PUBLICATIONS

Halliburton brochure entitled "Super CBL Additive Cement Additive" dated 1999.
Halliburton brochure entitled "MicroBond Expanding Additive for Cement" dated 1999.
Halliburton brochure entitled "FlexPlug Service Stop Lost Circulation, Hold Your Bottom Line" dated 1998.
Halliburton brochure entitled "FlexPlug® Service."
Halliburton brochure entitled "FlexPlug® W Lost-Circulation Material" dated 2004.
Halliburton brochure entitled "FlexPlug® OBM Lost-Circulation Material" dated 2004.
Halliburton brochure entitled "CFR-3™ Cement Friction Reducer Dispersant" dated 2004.
Halliburton brochure entitled "Flo-Chek® A Additive" dated 1999.
Halliburton brochure entitled "HydroChek Service—MOC/One Slurry for Selective Water Control."
Baroid brochure entitled "DIAMOND SEAL™" dated 1998.
Baroid brochure entitled "HYDRO-PLUG™ Lost Circulation Plug" dated 2002.
Halliburton brochure entitled "Accolade™ Drilling Fluid Exceeds New GOM Environmental Standards and Boosts Performance" dated 2002.
Baroid Fluid Services brochure entitled "ADAPTA™ HPHT Filtration Reducer" dated 2005.
Baroid Fluid Services brochure entitled "AQUAGEL® Viscosifier" dated 2005.
Baroid Fluid Services brochure entitled "BARACARB® Bridging Agent" dated 2005.
Baroid Fluid Services brochure entitled "BARAZAN® D Viscosifier/Suspenions Agent" dated 2005.
Baroid Fluid Services brochure entitled "BARAZAN® D Plus Viscosifier/Suspension Agent" dated 2005.
Baroid Fluid Services brochure entitled "CARBONOX® Filtration Control Agent" dated 2005.
Baroid Fluid Services brochure entitled "CLAY GRABBER® Flocculant" dated 2005.
Baroid Fluid Services brochure entitled "CLAYSEAL® Shale Stabilizer" dated 2005.
Baroid Fluid Services brochure entitled "CLAY SYNC® Shale Stabilizer" dated 2005.
Baroid Fluid Services brochure entitled "COLD® Thinner" dated 2005.
Baroid Fluid Services brochure entitled "DURATONE® E Filtration Control Agent" dated 2005.
Baroid Fluid Services brochure entitled "DURATONE® HT Filtration Control Agent" dated 2005.
Baroid Fluid Services brochure entitled "EX MUL® NT Emulsifier" dated 2005.
Baroid Fluid Services brochure entitled "FILTER-CHEK® Filtration Control Agent" dated 2005.
Baroid Fluid Services brochure entitled "GELTONE® Viscosifier" dated 2005.
Baroid Fluid Services brochure entitled "GELTONE® II Viscosifier" dated 2005.
Baroid Fluid Services brochure entitled "GELTONE® IV Viscosifier" dated 2005.
Baroid Fluid Services brochure entitled "GELTONE® V Viscosifier" dated 2005.
Baroid Fluid Services brochure entitled "GEM® 2000 Shale Stabilizer" dated 2005.
Baroid Fluid Services brochure entitled "GEM® CP Shale Stabilizer" dated 2005.
Baroid Fluid Services brochure entitled "GEM® GP Shale Stabilizer" dated 2005.
Baroid Fluid Services brochure entitled "QUIK-THIN® Thinner" dated 2005.
Baroid Fluid Services brochure entitled "RHEMOD® L Viscosifier/Suspension Agent" dated 2005.
Baroid Fluid Services brochure entitled "STEELSEAL® Lost Circulation Material" dated 2005.
Baroid Fluid Services brochure entitled "SUSPENTONE® Suspension Agent" dated 2005.
Baroid Fluid Services brochure entitled "LE® SUPERMUL Emulsifier" dated 2005.
Kaiser, T.M.V. et al., "Inflow Analysis and Optimization of Slotted Liners" 2002.
Coordinated optimization, new well design reduce wellbore stability problems in Valhall field Oil & Gas Journal, 2004.
"Halliburton's solution to highly reactive clay formation challenges" technology Hydro-Guard, 2003.
"Halliburton's solution to highly reactive clay formation challenges" PetroMin, 2002.
Derwent Abstract No. 1983-704150, abstract of Soviet Union Patent Publication No. SU 953187 published on Aug. 23, 1982.
Derwent Abstract No. 1992-072444, abstract of South Africa Patent Publication No. ZA 9100876A published on Dec. 24, 1991.
Derwent Abstract No. 1998-519099, abstract of Russian Patent Publication No. 2107158 C1 published on Mar. 20, 1998.
Derwent Abstract No. 2001-180538, abstract of Russian Patent Publication No. 2160822 C2 published on Dec. 20, 2000.
Derwent Abstract No. 2002-525993, abstract of Russian Patent Publication No. 2183264 C2 published on Jun. 10, 2002.
Foreign Communication from a related counterpart application—International Search Report, PCT/GB 03105537, Apr. 16, 2004, 6 pages.
Foreign Communication from a related counterpart application—International Search Report and Written Opinion, PCT/GB2004/000671, Jul. 12, 2004, 6 pages.
Foreign Communication from a related counterpart application—International Search Report and Written Opinion, PCT/GB2004/001646, Jul. 27, 2004, 7 pages.
Foreign Communication from a related counterpart application—International Search Report and Opinion, PCT/GB 2004/000411, Jun. 16, 2004, 6 pages.
Halliburton brochure entitled "FlexPlug® Service: Helps Operator Solve Lost Circulation Problems Quickly and Effectively," 1998, 3 pages, Halliburton Energy Services, Inc.
Office Action dated Dec. 22, 2003 (9 pages), U.S. Appl. No. 10/375,183, filed Feb. 27, 2003.
Office Action dated Nov. 17, 2004 (16 pages), U.S. Appl. No. 10/375,183, filed Feb. 27, 2003.
Office Action dated Apr. 19, 2005 (11 pages), U.S. Appl. No. 10/375,183, filed Feb. 27, 2003.
Office Action (Final) dated Aug. 29, 2005 (22 pages), U.S. Appl. No. 10/375,183, filed Feb. 27, 2003.
Office Action dated Aug. 29, 2007 (36 pages), U.S. Appl. No. 10/375,183, filed Feb. 27, 2003.
Office Action (Final) dated Jan. 14, 2008 (7 pages), U.S. Appl. No. 10/375,183, filed Feb. 27, 2003.
Office Action dated Mar. 17, 2004 (9 pages), U.S. Appl. No. 10/375,205, filed Feb. 27, 2003.
Office Action dated Jul. 29, 2004 (8 pages), U.S. Appl. No. 10/375,206, filed Feb. 27, 2003.
Office Action dated Jan. 31, 2005 (14 pages), U.S. Appl. No. 10/375,206, filed Feb. 27, 2003.

Office Action dated Jan. 16, 2007 (26 pages), U.S. Appl. No. 10/970,444, filed Oct. 21, 2004.
Office Action dated Feb. 12, 2008 (6 pages), U.S. Appl. No. 10/970,444, filed Oct. 21, 2004.
Office Action dated Apr. 10, 2007 (28 pages), U.S. Appl. No. 10/967,121, filed Oct. 18, 2004.
Office Action dated Oct. 10, 2007 (9 pages), U.S. Appl. No. 10/967,121, filed Oct. 18, 2004.
Office Action (Final) dated Apr. 4, 2008 (9 pages), U.S. Appl. No. 10/967,121, filed Oct. 18, 2004.
Office Action dated Apr. 11, 2007 (24 pages), U.S. Appl. No. 11/090,496, filed Mar. 25, 2005.
Office Action dated Oct. 18, 2007 (6 pages), U.S. Appl. No. 11/090,496, filed Mar. 25, 2005.
Translation of Russian Patent Publication No. RU 2107158 C1 published on Mar. 20, 1998.
Translation of Russian Patent Publication No. RU 2160822 C2 published on Dec. 20, 2000.
Translation of Russian Patent Publication No. RU 2183264 C2 published on Jun. 10, 2002.
Office Action dated May 14, 2008 (11 pages), U.S. Appl. No. 11/090,496, filed Mar. 25, 2005.
Office Action dated Nov. 24, 2008 (11 pages), U.S. Appl. No. 11/090,496, filed Mar. 25, 2005.
Office Action dated Dec. 5, 2008 (7 pages), U.S. Appl. No. 10/375,183, filed Feb. 27, 2003.
Office Actiond dated Jan. 8, 2009 (18 pages), U.S. Appl. No. 10/970,444, filed Oct. 21, 2004.
Office Action dated Jun. 30, 2008 (20 pages), U.S. Appl. No. 10/967,121, filed Oct. 18, 2004.
Office Action dated Jul. 25, 2008 (5 pages), U.S. Appl. No. 10/375,183, filed Feb. 27, 2003.
Office Action (Final) dated Feb. 4, 2009 (20 pates), U.S. Appl. No. 10/967,121, filed Oct. 18, 2004.
Office Action dated Apr. 15, 2009 (12 pages), U.S. Appl. No. 10/970,444, filed Oct. 21, 2004.
Office Action dated Jun. 9, 2009 (10 pages), U.S. Appl. No. 11/090,496, filed Mar. 25, 2005.
Advisory Action dated Jun. 6, 2008 (3 pages), U.S. Appl. No. 10/967,121, filed Oct. 18, 2004.
Advisory Action dated Apr. 15, 2009 (3 pages), U.S. Appl. No. 10/967,121, filed Oct. 18, 2004.
Derwent Abstract No. 2001-180538, abstract of Russian Patent Publication No. 2160822 C2, 2009, 2 pages, Derwent Information Ltd.
Foreign communication from a related counterpart application—International Search Report and Written Opinion, PCT/EP2004/005479, Sep. 30, 2004, 8 pages.
Foreign communication from a related counterpart application—International Preliminary Report on Patentability, PCT/EP2004/005479, Aug. 30, 2005, 7 pages.
Notice of Allowance dated Nov. 3, 2009 (10 pages), U.S. Appl. No. 10/967,121, filed Oct. 18, 2004.
Office Action dated Jul. 16, 2009 (19 pages), U.S. Appl. No. 10/375,183, filed Feb. 27, 2003.
Office Action dated Jul. 21, 2009 (18 pages), U.S. Appl. No. 10/967,121, filed Oct. 18, 2004.
Office Action (Final) dated Nov. 20, 2009 (9 pages), U.S. Appl. No. 10/970,444, filed Oct. 21, 2004.
Office Action dated Dec. 31, 2009 (11 pages), U.S. Appl. No. 11/090,496, filed Mar. 25, 2005.
Office Action dated Jan. 5, 2010 (15 pages). U.S. Appl. No. 10/375,183, filed Feb. 27, 2003.

* cited by examiner

Figure 1. FLEXPLUG Material Profile for the Extrusion Rheometer Run Using 6INLX3MMW Core.

Figure 2. AE 200 polymer:1% NaCl (1:3) Profile for the Extrusion Rheometer Run Using 6INLX1MMW Core.

Figure 3. AE 200 polymer: Sea Water (1:3) Profile for the Extrusion Rheometer Run Using 4INLX1MMW Core.

Figure 4. Bagley Coefficient = $F_0 / F_{L2}$ = 28.33 / 283 = 0.10 or 10%

Figure 5. Bagley Coefficient = $F_0 / F_{L2}$ = 22.4 / 166.8 = 0.134 or 13.4%

INVERSE EMULSION POLYMERS AS LOST CIRCULATION MATERIAL

BACKGROUND OF THE INVENTION

1. Field of the Invention

This invention relates to the field of sealant compositions and more specifically to sealant compositions comprising inverse emulsion polymers as well as methods for using such compositions to service a wellbore.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (e.g., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing. While a cement slurry is one type of sealant composition used in primary and secondary cementing operations, other non-cement containing sealant compositions may also be employed.

For instance, a process known as gunk-squeeze involves placing a gunk plug in a lost circulation zone to reduce fluid loss. Gunk-squeeze involves mixing a clay such as bentonite with a diesel and placing the mixture in the wellbore where the clay contacts water to form a sealant composition. Drawbacks include downhole delivery problems such as mixing the water with the clay in the wellbore. Further drawbacks include the gunk-squeeze process typically being insufficient for vugular losses because the composition has a slow reacting chemistry. Other processes include using particles to seal lost circulation zones. Drawbacks to such processes include operating costs (e.g., increased pumping costs). Further drawbacks include insufficient plugging of large lost circulation zones.

Consequently, there is a need for an improved sealant composition. Further needs include a sealant composition that is sufficient for plugging lost circulation zones and that is easily delivered downhole.

BRIEF SUMMARY OF SOME OF THE PREFERRED EMBODIMENTS

These and other needs in the art are addressed in one embodiment by a method of servicing a wellbore that penetrates a subterranean formation. The method comprises placing a sealant composition comprising an inverse emulsion polymer into the wellbore to reduce a loss of fluid to the subterranean formation during placement of the fluid in the wellbore.

In another embodiment, these and other needs in the art are addressed by a sealant composition comprising an inverse emulsion polymer. The inverse emulsion polymer comprises particles having a particle size from about 0.01 microns to about 30 microns.

In one embodiment, these and other needs in the art are addressed by a sealant composition comprising an oil dispersed polymer comprising particles having an average particle size from about 0.01 microns to about 30 microns.

The sealant composition comprising an inverse emulsion polymer overcomes problems in the art. For instance, the sealant composition may be easily delivered downhole. In addition, the sealant composition may reduce fluid loss in large permeable zones such as a vugular fracture.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

In an embodiment, a sealant composition comprises an inverse emulsion polymer. The sealant composition is a mixture that can viscosify in wellbore zones where a fluid (e.g., drilling fluid) is being lost. For instance, the sealant composition may viscosify in a lost circulation zone and thereby restore circulation. The viscosified mixture can set into a flexible, resilient and tough material, which may prevent further fluid losses when circulation is resumed. The inverse emulsion polymer may have similar characteristics to a liquid and therefore may be suitable for delivery downhole in a wellbore.

The sealant composition is for use in a wellbore that penetrates a subterranean formation. It is to be understood that "subterranean formation" encompasses both areas below exposed earth and areas below earth covered by water such as ocean or fresh water. The sealant composition can be used for any purpose. For instance, the sealant composition can be used to service the wellbore. Without limitation, servicing the wellbore includes positioning the sealant composition in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into lost circulation zones such as a void, vugular zone, or fracture; to be used as a fluid in front of cement slurry in cementing operations; to seal an annulus between the wellbore and an expandable pipe or pipe string; and combinations thereof.

The inverse emulsion polymer includes a water-in-oil emulsion with a water swellable polymer dispersed in the emulsion. The emulsion contains a continuous phase of oil and a dispersed phase of water. The oil may be any oil that is immiscible with water and suitable for use in a wellbore. Without limitation, examples of suitable oils include a petroleum oil, a natural oil, a synthetically derived oil, a mineral oil, silicone oil, or combinations thereof. In some embodiments, the oil may be an alpha olefin, an internal olefin, an ester, a diester of carbonic acid, a paraffin, a kerosene oil, a diesel oil, a mineral oil, silicone oil, or combinations thereof. The water may be any suitable water for forming the dispersed phase and for use in a wellbore. Without limitation, examples of suitable waters include deionized water, municipal treated water; fresh water; sea water; naturally-occurring brine; a chloride-based, bromide-based, or formate-based brine containing monovalent and/or polyvalent cations; or combinations thereof. Examples of suitable chloride-based brines include without limitation sodium chloride and calcium chloride. Further without limitation, examples of suitable bromide-based brines include sodium bromide, calcium bromide, and zinc bromide. In addition, examples of formate-based brines include without limitation sodium formate, potassium formate, and cesium formate.

The inverse emulsion polymer may contain any suitable amount of oil and water to form an inverse emulsion suitable for dispersion of the water swellable polymer and for placement in a wellbore. In an embodiment, the inverse emulsion polymer contains from about 10 wt. % to about 80 wt. % oil, alternatively from about 30 wt. % to about 50 wt. % oil by total weight of the inverse emulsion polymer. In addition, the inverse emulsion polymer contains from about 0 wt. % to about 70 wt. % water, alternatively from about 30 wt. % to about 70 wt. % water by total weight of the inverse emulsion polymer.

In some embodiments, the inverse emulsion polymer contains an emulsifier. The emulsifier may be any emulsifier suitable for holding the oil and water in suspension. In an embodiment, the inverse emulsion polymer contains water-soluble and oil-soluble emulsifiers (e.g., emulsifying agents or surfactants) to stabilize the inverse emulsion polymer. Without limitation, examples of suitable emulsifiers include polyvalent metal soaps, phosphate esters, fatty acids, fatty acid soaps, alkylbenzene sulfonate, or combinations thereof. The inverse emulsion polymer may contain any amount of emulsifier suitable for holding the oil and water in suspension. In an embodiment, the inverse emulsion polymer contains from about 1 wt. % to about 10 wt. % emulsifier, alternatively from about 1 wt. % to about 20 wt. % emulsifier by total weight of the inverse emulsion polymer.

The inverse emulsion polymer may contain any desired amount of the water swellable polymer effective for the intended wellbore service. In an embodiment, the inverse emulsion polymer contains from about 30 wt. % to about 50 wt. % water swellable polymer, alternatively from about 30 wt. % to about 70 wt. % water swellable polymer, and alternatively from about 5 wt. % to about 100 wt. % water swellable polymer by total weight of the inverse emulsion polymer. A water swellable polymer refers to any polymer that is capable of absorbing water and swelling, i.e., increasing in size as it absorbs the water. In an embodiment, upon swelling of the water swellable polymer, the inverse emulsion polymer forms a paste-like mass that is effective for blocking a flow pathway of a fluid. In some embodiments, the paste-like mass has a relatively low permeability to fluids used to service a wellbore such as a drilling fluid, a fracturing fluid, a cement, an acidizing fluid, an injectant, and the like, thus creating a barrier to the flow of such fluids. A paste-like mass refers to a soft, viscous mass of solids (e.g., the swelled water swellable polymer) dispersed in a liquid (the inverse emulsion). In an alternative embodiment, the inverse emulsion forms a substantially hard, viscous mass when mixed with mud. Without limitation, examples of suitable water swellable polymers include synthetic polymers, superabsorbers, natural polymers, or combinations thereof. Examples of suitable synthetic polymers include crosslinked polyacrylamide, polyacrylate, or combinations thereof.

In an embodiment, the water swellable polymer includes superabsorbers. Superabsorbers are commonly used in absorbent products such as horticulture products, wipe and spill control agents, wire and cable water-blocking agents, ice shipping packs, diapers, training pants, feminine care products, and a multitude of industrial uses. Superabsorbers are swellable, crosslinked polymers that have the ability to absorb and store many times their own weight of aqueous liquids. Superabsorbers retain the liquid that they absorb and typically do not release the absorbed liquid, even under pressure. Examples of superabsorbers include sodium acrylate-based polymers having three dimensional, network-like molecular structures. Without being limited by theory, the polymer chains are formed by the reaction/joining of hundreds of thousands to millions of identical units of acrylic acid monomers, which have been substantially neutralized with sodium hydroxide (caustic soda). Further, without being limited by theory, the crosslinking chemicals tie the chains together to form a three-dimensional network, which enable the superabsorbers to absorb water or water-based solutions into the spaces in the molecular network and thus form a gel that locks up the liquid. Additional examples of suitable superabsorbers include but are not limited to crosslinked polyacrylamide; crosslinked polyacrylate; crosslinked hydrolyzed polyacrylonitrile; salts of carboxyalkyl starch, for example, salts of carboxymethyl starch; salts of carboxyalkyl cellulose, for example, salts of carboxymethyl cellulose; salts of any crosslinked carboxyalkyl polysaccharide; crosslinked copolymers of acrylamide and acrylate monomers; starch grafted with acrylonitrile and acrylate monomers; crosslinked polymers of two or more of allylsulfonate, 2-acrylamido-2-methyl-1-propanesulfonic acid, 3-allyloxy-2-hydroxy-1-propane-sulfonic acid, acrylamide, and acrylic acid monomers; or combinations thereof. In an embodiment, the water swellable polymer comprises a crosslinked polyacrylamide and/or polyacrylate. In one embodiment, the superabsorber absorbs not only many times its weight of water but also increases in volume upon absorption of water many times the volume of the dry material. In an embodiment, the superabsorber increases from about 10 to about 800 times its original weight.

In an embodiment, the water swellable polymer has a particle size (i.e., diameter) from about 0.01 microns to about 30 microns, alternatively from about 1 micron to about 3 microns, before it absorbs water (i.e., in its solid form). The swell time of the water swellable polymer may be in a range from about 5 seconds to about 5 hours, alternatively from about 1 second to about 48 hours.

Without being limited by theory, the micron size of the water swellable polymer allows the inverse emulsion polymer to behave as a liquid (e.g, has similar flow characteristics to a liquid) that is sufficient for delivery downhole in a wellbore. Further, without being limited by theory, the micron size also allows a dehydrated form of the inverse emulsion polymer (e.g., the oil dispersed polymer) to behave as a liquid. The inverse emulsion polymer has a density from about 1.1 g/ml to about 1.7 g/ml, alternatively from about 1.0 g/ml to about 2.5 g/ml. In addition, the inverse emulsion polymer has an absorption capacity from about 10 to about 100 times of its own weight, alternatively from about 1 to about 1,000 times of its own weight.

A suitable commercial example of the inverse emulsion polymer is AE 200 polymer, which is available from Hychem, Inc. AE 200 polymer contains about 30 wt. % water swellable polymers, about 30 wt. % mineral oil, about 30 wt. % water, and about 10 wt. % emulsifier. The water swellable polymer is comprised of about 30 wt. % polyacrylic acid and about 70 wt. % polyacrylamide cross linked polymers. The particle size of the water swellable polymer is about 1 to about 3 microns. The inverse emulsion polymer may have a pH of from about 5.0 to about 8.0, preferably from about 6.0 to about 7.5. The inverse emulsion polymer may have a density of from about 1.0 g/ml to about 2.5 g/ml, preferably from about 1.1 g/ml to about 1.7 g/ml.

In an embodiment, a dehydrated inverse emulsion polymer is placed in the wellbore. The inverse emulsion polymer is suitably dehydrated to remove at least a portion of the water and provide an oil dispersed polymer. In an embodiment, the inverse emulsion polymer is dehydrated to form an oil dispersed polymer comprising from about 0 wt. % to about 10 wt. % water, alternatively from about 0 wt. % to about 5 wt. % water, and alternatively from about 3 wt. % to about 5 wt. % water. Without being limited by theory, the inverse emulsion polymer is dehydrated because dehydration provides a higher percentage of the water swellable polymer in the polymer. Further, without being limited by theory, the inverse emulsion polymer is dehydrated to reduce the possibility of substantially changing the original oil-based drilling fluid properties. The inverse emulsion polymer may be dehydrated to provide the oil dispersed polymer by any suitable method. In an embodiment, the oil dispersed polymer comprises from about 45 wt. % to about 50 wt. % oil, alternatively from about 30 wt. % to about 70 wt. % oil by total weight of the oil dispersed polymer. In addition, the oil dispersed polymer comprises from about 45 wt. % to about 50 wt. % water swellable polymer, alternatively from about 30 to about 70 wt. % water swellable polymer by total weight of the oil dispersed polymer.

The oil dispersed polymer has a density from about 1.2 g/ml to about 1.7 g/ml, alternatively from about 1.0 g/ml to about 2.5 g/ml. In addition, the oil dispersed polymer has an absorption capacity from about 10 to about 200 times of its own weight, alternatively from about 1 to about 1,000 times of its own weight.

Without limitation, a commercial example of a dehydrated inverse emulsion polymer (e.g., oil dispersed polymer) is AD 200 polymer, which is available from Hychem, Inc. AD 200 polymer is a crosslinked polymer that contains about 1-3 wt. % water and about 50 wt. % active components, which includes water swellable polymers in an amount of about 30 wt. % polyacrylate and about 70 wt. % polyacrylamide by total weight of the polymer. AD 200 polymer has a density of 1.25 g/ml (±10%). In addition, AD 200 polymer has an absorption capacity (in distilled water) of 20 g distilled water/1 g AD 200 polymer and further has an absorption capacity (in 3% NaCl solution) of 5 g 3% NaCl solution/1 g AD 200 polymer. AD 200 polymer also has a percent of non volatile residues at 150° C. for 16 hours at 63% (±10%).

In some embodiments, the sealant composition includes additives that may be suitable for improving or changing its properties. Without limitation, examples of suitable additives include particulate materials, viscosifying agents, weighting materials, or combinations thereof. The weighting materials may be used to increase the density of the sealant composition. In one embodiment, a sufficient amount of weighting material is mixed with the sealant composition to increase the density of the composition at which it passes down through the wellbore. Without being limited by theory, the increased density may increase the rate at which the sealant composition passes down through the fluid in the wellbore. Further, without being limited by theory, the density is increased to reduce the possibility of a wellbore blow out. Without limitation, examples of suitable weighting materials include barite, silica flour, zeolites, lead pellets, sand, fibers, polymeric material, or combinations thereof. The density may increase to any desired density. In one embodiment, the density is increased to a density from about 10 ppg to about 20 ppg.

In one embodiment, the inverse emulsion polymer is introduced to the wellbore to prevent the loss of aqueous or non-aqueous drilling fluids into lost circulation zones such as voids, vugular zones, and natural or induced fractures while drilling. During the wellbore treatment, various components may be pumped sequentially down the workstring and/or simultaneous down the annulus as appropriate for a given treatment. In an embodiment, the inverse emulsion polymer is pumped in the wellbore to service the wellbore. Before the inverse emulsion polymer is pumped into the wellbore, a spacer fluid may be pumped into the wellbore. In some embodiments, the spacer fluid is suitable for removing water (i.e., from the pipes). For instance, the spacer fluid may contain a wetting agent such as LE SUPERMUL emulsifier. LE SUPERMUL emulsifier is commercially available from Halliburton Energy Services, Inc. The inverse emulsion polymer is then pumped into the wellbore. In some embodiments, weighting material such as barite is added to the inverse emulsion polymer prior to pumping the inverse emulsion polymer into the wellbore. After such pumping, additional spacer fluid may be pumped into the wellbore. The sealant composition is formed and provides a relatively viscous mass inside the lost circulation zone. Drilling fluid may then be pumped into the wellbore under suitable pressure to squeeze the sealant composition into the lost circulation zone. The sealant composition can also form a non-flowing, intact mass inside the lost circulation zone. This mass plugs the zone and inhibits loss of subsequently pumped drilling fluid, which allows for further drilling. In an embodiment wherein the drilling fluid is non-aqueous, a treating composition may be pumped into the wellbore after the inverse emulsion polymer and additional spacer are pumped. In an embodiment, a sufficient amount of the treating composition may be pumped to reduce the amounts of calcium and magnesium in the drilling fluid in contact with the inverse emulsion polymer. In an embodiment, the treating composition comprises soda ash, $NaHCO_3$, a monovalent salt, a divalent salt, or combinations thereof. Without limitation, examples of such salts include $Na^+$, $K^+$, $Ca^{2+}$ and $Ma^{2+}$. Without being limited by theory, the calcium and magnesium are reduced to prevent salt poisoning in the inverse emulsion polymer or oil dispersed polymer, which may prevent the formation of the desired solid paste to plug the void in the formation. In such an embodiment, a spacer fluid may then be pumped into the wellbore followed by the drilling fluid. It is to be understood that non-aqueous drilling fluids may include a diesel, a mineral oil, an internal olefin, a linear alpha-olefin, an ester, or combinations thereof. In alternative embodiments, no spacer fluid is pumped into the wellbore before and/or after the inverse emulsion polymer is pumped into the wellbore. In some embodiments, the inverse emulsion polymer is dehydrated to form the oil dispersed polymer, and the sealant composition is formed therefrom.

In one embodiment, the sealant composition is placed in the wellbore with a water-based mud. The method for placement includes pumping a treated and active drilling mud into the wellbore. Any suitable amount of the drilling mud may be pumped into the wellbore. For instance, an amount of drilling mud comprising from about 15 to about 20 barrels may be pumped into the wellbore. In an instance in which soluble calcium is present in the mud, the mud may be treated with a treating composition to treat out at least a portion of the calcium. In an embodiment, the mud is treated when the calcium is present in an amount greater than 200 mg/l. Any suitable amount of the treating composition may be used. A spacer (e.g., LE SUPERMUL emulsifier) is pumped into the wellbore following the mud. Any suitable amount of spacer may be pumped into the wellbore. For instance, an amount of spacer comprising from about 5 barrels to about 10 barrels may be pumped into the wellbore, alternatively from about 6 barrels to about 7 barrels may be pumped into the wellbore. The inverse emulsion polymer is pumped into the wellbore following the spacer. An amount of the inverse emulsion polymer comprising from about 15 to about 20 barrels, alternatively from about 16 to about 17 barrels may be pumped into the wellbore. The inverse emulsion polymer may be weighted with a weighting material. An amount of spacer is then pumped into the wellbore. The amount of spacer may include from about 5 barrels to about 10 barrels, alternatively from about 6 barrels to about 7 barrels is pumped into the wellbore. A suitable amount of the mud is then pumped into the wellbore. In an embodiment, the amount of mud is 20 barrels or less. After the mud is pumped into the wellbore, a light squeeze pressure is maintained for a suitable time for the sealant composition to form the non-flowing, intact mass inside the lost circulation zone. Any suitable pressure is maintained. For instance, the pressure may be from about 175 to about 225 psi. It is to be understood that in some embodiments an oil dispersed polymer is placed in the wellbore with the water-based mud instead of the inverse emulsion polymer.

In another embodiment, the sealant composition is placed in the wellbore with a non-aqueous mud. The method for placement includes pumping a spacer into the wellbore. Any suitable amount of spacer may be used. For instance, about 1 barrel of spacer may be pumped in the wellbore. The inverse emulsion polymer is pumped into the wellbore following the spacer. An amount of the inverse emulsion polymer comprising from about 10 to about 20 barrels, alternatively from about 16 to about 17 barrels, and alternatively about 11 barrels may be pumped into the wellbore. The inverse emulsion polymer may be weighted with a weighting material. An amount of spacer is pumped into the wellbore following the inverse emulsion polymer. In one embodiment, an amount of the spacer comprising from about 1 to about 5 barrels, alternatively from 3 to about 5 barrels, and alternatively about 2 barrels is pumped into the wellbore. A treating composition (e.g., soda ash) is pumped into the wellbore following the spacer. For instance, soda ash may be mixed with a spacer, drilling mud, or AD 200 polymer and pumped into the wellbore. Any suitable amount of the treating composition may be pumped to prevent salt poisoning of the inverse emulsion polymer. In some embodiments, from about 30 to about 70 barrels of the treating composition, alternatively from about 35 to about 40 barrels, and alternatively from about 50 to about 70 barrels are pumped into the wellbore. An amount of spacer fluid is pumped into the wellbore following the treating composition. In one embodiment, an amount of the spacer from about 1 to about 5 barrels is pumped into the wellbore, alternatively from about 3 to about 5 barrels, and alternatively about 3.5 barrels. A suitable amount of the mud is pumped into the wellbore following the spacer. In an embodiment, the amount of mud is 20 barrels or less. After the mud is pumped into the wellbore, a light squeeze pressure is maintained for a suitable time for the sealant composition to form the non-flowing, intact mass inside the lost circulation zone. Any suitable pressure is maintained. For instance, the pressure may be from about 175 to about 225 psi. It is to be understood that in some embodiments an oil dispersed polymer is placed in the wellbore with the nonaqueous mud instead of the inverse emulsion polymer.

In an embodiment, sealant compositions that include an inverse emulsion polymer may be employed in well completion operations such as primary and secondary cementing operations. In one embodiment, a spacer fluid is pumped through the drill pipe. The inverse emulsion polymer is then pumped through the drill pipe and forms the sealant composition. An additional amount of spacer fluid may then be pumped through the drill pipe. In alternative embodiments, no spacer fluid is pumped into the drill pipe before and/or after the inverse emulsion polymer. In primary cementing, such a sealant composition may be placed into an annulus of the wellbore and allowed to set such that it isolates the subterranean formation from a different portion of the wellbore. The sealant composition thus forms a barrier that prevents fluids in that subterranean formation from migrating into other subterranean formations. Within the annulus, the sealant composition also serves to support a conduit, e.g., casing, in the wellbore. In one embodiment, the wellbore in which the sealant composition is positioned belongs to a multilateral wellbore configuration. It is to be understood that a multilateral wellbore configuration includes at least two principal wellbores connected by one or more ancillary wellbores. In secondary cementing (often referred to as squeeze cementing), the sealant composition may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. In some embodiments, the inverse emulsion polymer is dehydrated to form the oil dispersed polymer, and the sealant composition is formed therefrom. Various procedures that may be followed to use the sealant composition in a wellbore are described in U.S. Pat. Nos. 5,346,012 and 5,588,488, which are incorporated by reference herein in their entirety.

To further illustrate various illustrative embodiments of the present invention, the following examples are provided.

EXAMPLE 1

In this Example 1, Runs were conducted (Runs 1-9) comparing a conventional lost circulation material, FLEXPLUG lost circulation material (Run 1), to an inverse emulsion polymer, AE 200 polymer (Runs 2-9). FLEXPLUG lost circulation material uses particles to prevent fluid loss and is commercially available from Halliburton Energy Services, Inc. Different ratios of AE 200 polymer were mixed with deionized water, a 1% NaCl solution, or sea water. An extrusion rheometer was used to test each mixture.

The main components of the extrusion rheometer consisted of a core, which had a slit with an opening of 1 mm, 2 mm or 3 mm in width. The rheometer was 2, 4 or 6 inches long. For each Run, the rheometer was filled with the material (AE 200 polymer or FLEXPLUG material) to be tested. A pressure was applied to push the material out of the different sizes of cores. It was observed that different forces were needed to push different materials out of the same core under the same conditions. Such force was measured in pounds and recorded. The results are listed below in Table I, wherein the samples are identified by length of the rheometer in inches by the width of the rheometer in millimeters (e.g., 2 in L by 1 mm W=2INLX1MMW).

The Bagley factor is defined as: Bagley factor=$F_0/F_{L2}$. $F_0$ is defined as the force when X=0. $F_{L2}$ is defined as the force obtained using the 4 inch core in this particular case. In general, the Bagley factor is between 0 and 80%. For FLEXPLUG material, the Bagley coefficient is generally between 25 and 80% and more typically between 35 and 55%. The smaller the Bagley factor, the easier the material is to be replaced by pressure or other materials.

TABLE I

| Sample ID | FLEXPLUG Material | AE 200 polymer:DI Water (1:9) | AE 200 polymer:1% NaCl (1:6) | AE 200 polymer:1% NaCl (1:3) | AE 200 polymer:Sea Water (1:3) |
|---|---|---|---|---|---|
| 2INLX1MMW | N/A | N/A | N/A | Ave: 209 SD: 2.38 COV: 1.1% | N/A |
| 4INLX1MMW | N/A | Ave: 134.7 SD: 5.67 COV: 4.2% | Ave: 136.3 SD: 5.7 COV: 4.2% | Ave: 283 SD: 1.15 COV: 0.5% | Ave: 248 SD: 1.16 COV: 0.5% |
| 6INLX1MMW | N/A | N/A | N/A | Ave: 517 SD: 6.56 COV: 1.3% | N/A |
| 2INLX2MMW | N/A | Ave: 46.1 SD: 2.61 COV: 5.7% | Ave: 41.3 SD: 3.27 COV: 7.9% | Ave: 90.6 SD: 1.88 COV: 2.1% | Ave: 82.0 SD: 1.76 COV: 2.1% |
| 4INLX2MMW | N/A | N/A | N/A | Ave: 166.8 SD: 2.15 COV: 1.3% | N/A |
| 6INLX2MMW | N/A | N/A | N/A | Ave: 231 SD: 4.85 COV: 2.1% | N/A |
| 2INLX3MMW | N/A | N/A | N/A | Ave: 52.6 SD: 3.01 COV: 5.7% | N/A |
| 4INLX3MMW | N/A | N/A | N/A | Ave: 80.9 SD: 1.87 COV: 2.3% | N/A |
| 6INLX3MMW | Ave: 526 SD: 69 COV: 13.1% | Ave: 57.2 SD: 8.9 COV: 15.6% | Ave: 62.1 SD: 1.19 COV: 1.9% | Ave: 114.4 SD: 8.34 COV: 7.3% | Ave: 108.8 SD: 7.82 COV: 7.2% |

In the Table I, the rheometer readings are listed in pounds. The listed number is an average of the recorded results for each Run. "SD" represents standard deviation, and "COV" represents the coefficient of variance, and is calculated by $SD/X_{Ave}$.

From Table I, it can be seen that the standard deviation and COV for the AE 200 inverse emulsion polymer was much better than the FLEXPLUG material. In various embodiments, rheometer readings for the inverse emulsion polymer have a SD of less than 9, 8, 7, 6, 5, 4, 3, or 2 and a COV of less than 8%, 7%, 6%, 5%, 4%, 3%, or 2%.

Figure 1:
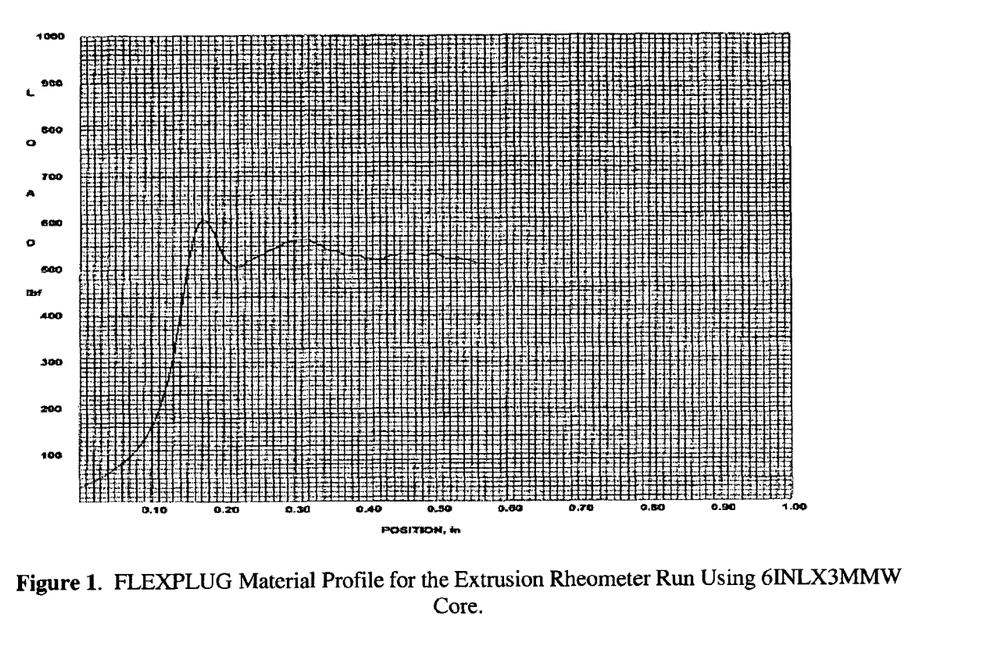
FIG. 1 illustrates a FLEXPLUG lost circulation material profile for an extrusion rheometer run.
Figure 2:
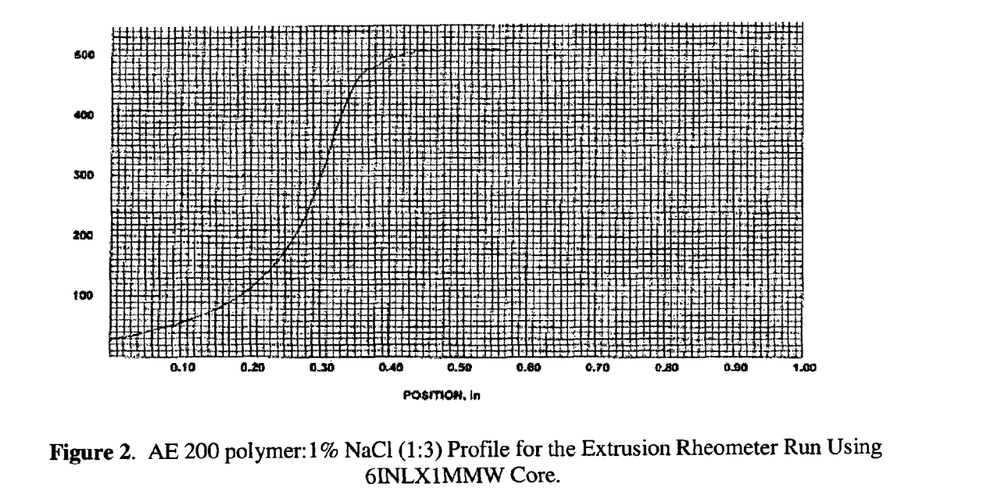
FIG. 2 illustrates an inverse emulsion polymer and NaCl profile for an extrusion rheometer run.
Figure 3:
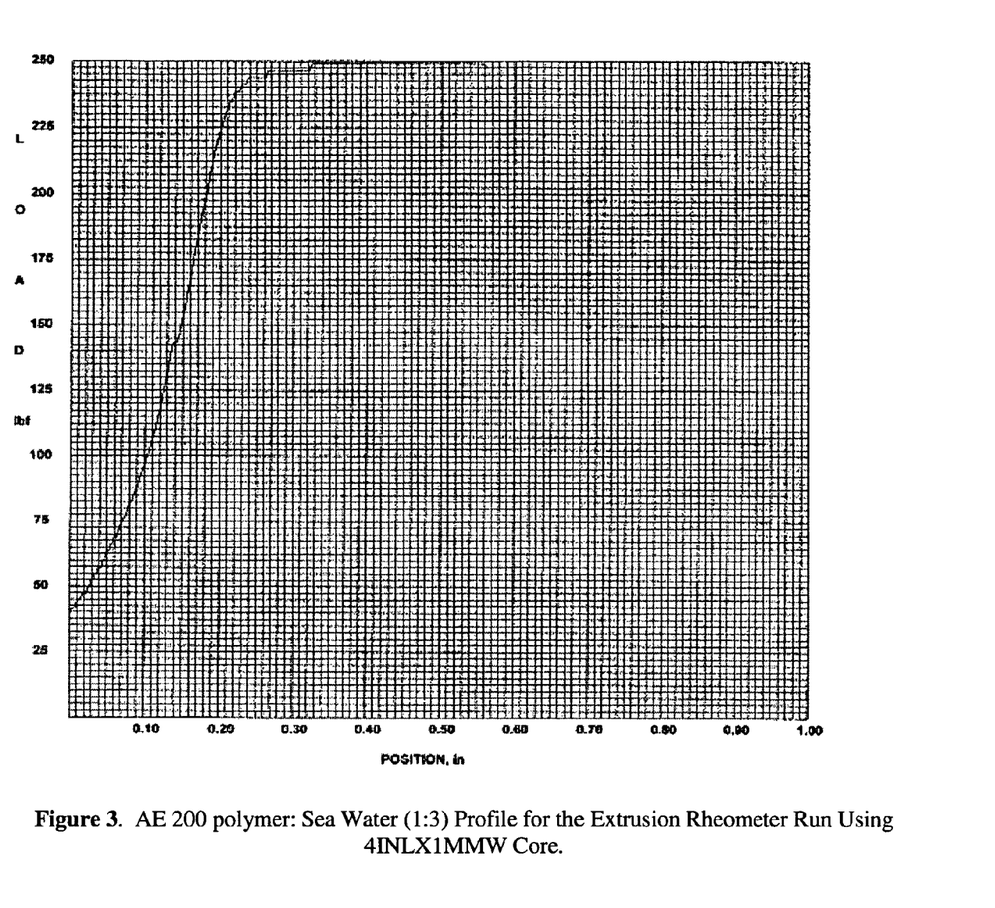
FIG. 3 illustrates an inverse emulsion polymer and sea water profile for an extrusion rheometer run.

FIG. 1 shows the FLEXPLUG material profile for its initial pressure, which is the initial pressure required to push the FLEXPLUG material into the vugular, cavernous formations. From FIG. 1, it can be seen that the FLEXPLUG material exhibits pressure drops. As shown in FIGS. 2 and 3, there were no such pressure drops for the AE 200 polymer sample. FIGS. 1-3 show position in inches on the x-axis and load in pounds-force on the y-axis.

EXAMPLE 2

The extrusion rheometer data from EXAMPLE 1 was used in EXAMPLE 2 to derive Bagley factors for each Run. In order to derive the Bagley factor, the width of the slit remained the same. The different forces were obtained by changing the lengths of the core under the same conditions as illustrated in FIG. 4.

Figure 4:
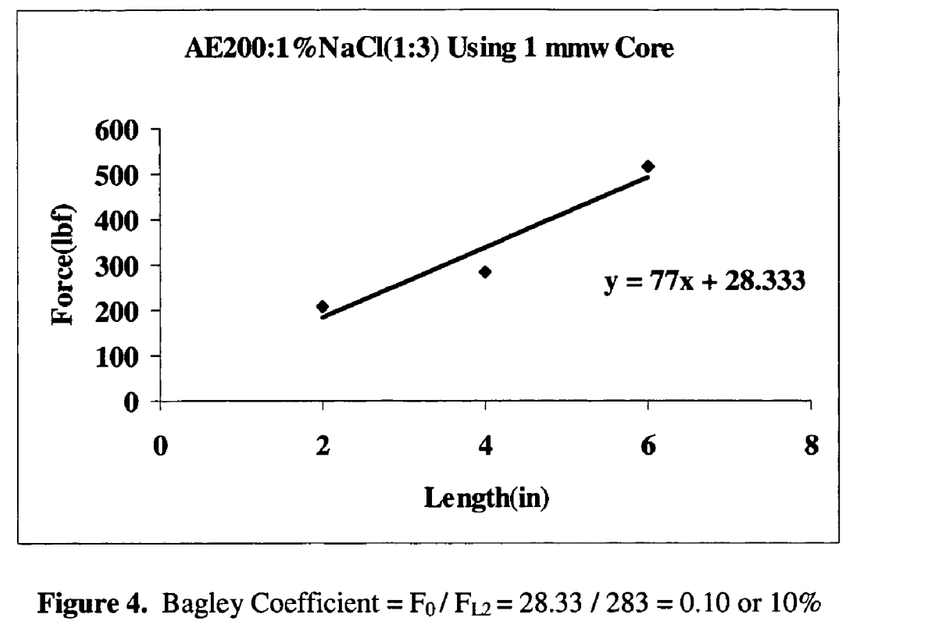
FIG. 4 illustrates a calculated Bagley coefficient for an inverse emulsion polymer and NaCl mixture.
Figure 5:
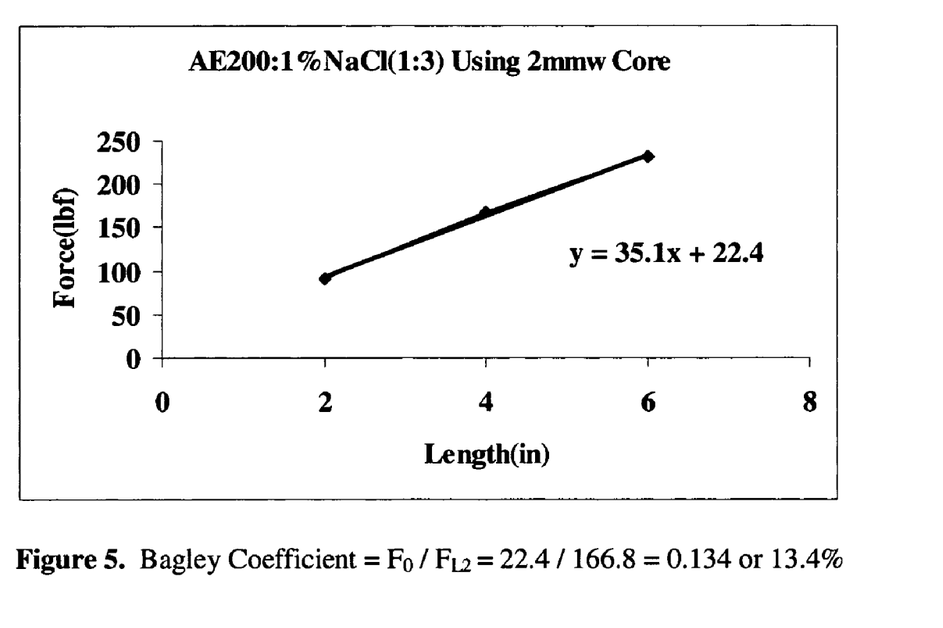
FIG. 5 illustrates a calculated Bagley coefficient for an inverse emulsion polymer and NaCl mixture.

FIGS. 4 and 5 illustrate calculated Bagley factors for different cores of AE 200 polymer:1% NaCl (1:3). From FIGS. 4 and 5, it can be seen that the Bagley factors are lower than such for FLEXPLUG material. By having such lower Bagley factors, the AE 200 polymer and 1% NaCl mixture may be more easily pushed into the fracture formations than the FLEXPLUG material.

EXAMPLE 3

AE 200 polymer was tested with a water based mud (lignosulfonate mud). Table II shows how the mud was formulated. AQUAGEL viscosifier is a viscosity and gelling agent that is commercially available from Halliburton Energy Services, Inc. QUIK-THIN thinner is a ferrochrome lignosulfonate that is commercially available from Halliburton Energy Services, Inc. CARBONOX filtration control agent is a lignite material that is commercially available from Halliburton Energy Services, Inc. REV-DUST additive is a calcium montmorillonite clay that is commercially available from Milwhite, Inc.

TABLE II

| Lignosulfonate Mud Formulation. | |
|---|---|
| Sample, (lb/gal) | 14.0 |
| Fresh water, bbl | 0.76 |
| AQUAGEL | 20 |

TABLE II-continued

Lignosulfonate Mud Formulation.

| viscosifier, lb/bbl | |
|---|---|
| QUIK-THIN thinner, lb/bbl | 6 |
| NaOH, lb/bbl | 3 (pH~11-11.5) |
| CARBONOX agent, lb/bbl | 4 |
| REV-DUST additive, lb/bbl | 30.0 |
| Barite, lb/bbl | 271.6 |

After hot roll in a 150° F. oven for 16 hrs, different concentrations of AE 200 polymer in the mud were tested with the results shown in Tables III and IV. The concentrations were tested by adding 1.0 mL of AE 200 polymer and different amounts of lignosulfonate mud (e.g., as required by the experiment such as 1×, 2× or 50×) to a beaker. The mixture was mixed well. The time needed for the mixture to harden and the conditions of the mixture were recorded.

TABLE III

Test Results of AE 200 polymer with Lignosulfonate Mud

| Sample | 1:1(v/v) | 1:2 | 1:10 | 1:20 | 1:30 | 1:50 |
|---|---|---|---|---|---|---|
| AE 200 polymer with Lignosulfonate Mud (with Fresh Water) | Thicken within 1 min. Forms loose solids | Thicken within 1 min. Forms clay like solids | Thicken within 1 min. Forms clay like solids | Thicken within 1 min. Forms clay like solids. Slightly wetter than 1:10 | Slightly slurry, more cement like | Slurry and watery |

TABLE IV

Test Results of AE 200 polymer with Lignosulfonate Mud

| Sample | 1:5(v/v) | 1:10 | 1:15 | 1:20 |
|---|---|---|---|---|
| AE 200 polymer with Lignosulfonate Mud (with Sea Water) | Thicken within 1 min. Forms rubbery clay | Thicken within 1 min. Forms clay like solids | Slurry at first, then harden after 1 hr | Slurry at first, then harden after 1.5 hr |

As can be seen from Tables III and IV, even with the dilution factor of 1:30 (AE 200 polymer:mud), the solid forms from the mixture of the two are still cement-like slurry paste. It can be further seen from such Tables that the dilution factor decreases to 10 instead of 20 when using the sea water version of the lignosulfonate mud. The cations in the sea water (e.g., $Na^+$, $K^+$, $Ca^{2+}$, $Mg^{2+}$ and etc.) may be affecting the performance of AE 200 polymer by salt poisoning. In this case, the salt poisoning effect was observed to be more serious for $Ca^{2+}$ than $Na^+$. To treat out the $Ca^{2+}$ ions, 0.2 lb/bbl of soda ash ($Na_2CO_3$) was added to the mud with excellent results. It was observed that the dilution factor increased back to 20, and the texture of the solid was also more like the fresh water mud.

EXAMPLE 4

In EXAMPLE 4, the salinity, pH and density effects on the performance of AE 200 polymer was observed. Different salinity, pH and density muds were formulated as shown in Table V. BARAZAN D Plus suspension agent/viscosifier is a dispersion enhanced xanthum gum that is commercially available from Halliburton Energy Services, Inc. FILTER-CHECK filtration control agent is a modified starch that is commercially available from Halliburton Energy Services, Inc. CLAY SYNC shale stabilizer is a clay inhibitor for water-based mud commercially available from Halliburton Energy Services, Inc. CLAY GRABBER flocculant is a polymeric additive for water-based drilling fluids commercially available from Halliburton Energy Services, Inc. CLAY SEAL shale stabilizer is a chemical drilling fluid additive commercially available from Halliburton Energy Services, Inc.

TABLE V

Mud Formulations

| | Fresh Water | 10% (w/w) NaCl | | 24% (w/w) NaCl | | |
|---|---|---|---|---|---|---|
| Sample, (lb/gal) | 13 | 13 | 10 | 13 | 13(w/o NaOH) | 16 |
| Fresh Water, bbl | 0.826 | — | — | — | — | — |
| 10%(w/w), NaCl, bbl | — | 0.845 | — | — | — | — |
| 24%(w/w), NaCl, bbl | — | — | 0.994 | 0.875 | 0.875 | 0.756 |
| NaOH, lb | 0.25 | 0.25 | 0.25 | 0.25 | — | 0.25 |
| BARAZAN D PLUS suspension agent/viscosifier, lb | 0.75 | 0.75 | 1.0 | 0.75 | 0.75 | 0.25 |

TABLE V-continued

| | Mud Formulations | | | | | |
|---|---|---|---|---|---|---|
| | Fresh Water | 10% (w/w) NaCl | 24% (w/w) NaCl | | | |
| FILTER-CHECK filtration control agent, lb | 4.0 | 4.0 | 4.0 | 4.0 | 4.0 | 4.0 |
| CLAY SYNC shale stabilizer, lb | 3.25 | 2.75 | 2.0 | 2.0 | 2.0 | 2.0 |
| CLAY GRABBER flocculant (active), lb | 0.50 | 0.5 | 0.5 | 0.5 | 0.5 | 0.5 |
| CLAY SEAL shale stabilizer, lb | 4.0 | 4.0 | 4.0 | 4.0 | 4.0 | 4.0 |
| Barite, lb | 256.3 | 228.3 | 81.5 | 183.2 | 183.2 | 358.3 |

All the muds from Table V were hot rolled at 150° F. in an oven for 16 hrs. The pH measurements were taken after the hot roll. The densities of the muds as mixed with the 24% (w/w) NaCl were measured as shown in Table VI. The mud from Table V (24% (w/w) NaCl (density=13) was added a different amount of NaOH to adjust the pH of the muds and to determine how much mud was needed to achieve the same results.

mud with a density of 10. Under the same conditions, by comparing the mud with pH=7.66 and 11, it was observed that it takes 1.5 min. to form the solid at pH=7.66 vs. 1 min. for pH=11, which may be attributed to "salt poisoning" (e.g., cation poisoning effect) on AE 200 polymer. The lower the pH, the more free $H^+$ ions that may be in the solution, and the worse the salt poisoning effect AE 200 polymer may have.

TABLE VI

| How Density and pH Affect the Performance of AE 200 Polymer | | | | | |
|---|---|---|---|---|---|
| | 24% (w/w) NaCl | | | | |
| Density, (lb/gal) | 10 | 13 | 13 | 13 | 16 |
| Mud vol. (mL) | 10 | 10 | 10 | 10 | 10 |
| pH | 9.05 | 7.66 | 9.06 | 11.0 | 9.05 |
| AE 200 polymer (mL) | 4 | 3 | 3 | 3 | 2 |
| Observations | It needs the most AE 200 polymer to form polymer paste/solids. The texture of the paste is also the most loose one among all other samples. | It takes the longest time (1.5 min. vs. ~1 min.) to harden compared with all other mud with the same density, but different pH. | It takes the same amount of AE 200 polymer to form solids/paste when the density is the same regardless of the differences in pH. | There is no significant difference when pH changes from 9 to 11. | It takes only 2 mL of AE 200 polymer to form paste/solids. The texture/strength of the solid formed also is the best. |

Density may play an important role on the quality of the solid after mixing mud with AE 200 polymer and may also determine the amount of AE 200 polymer needed to form the solid. As shown in Table VI, under the same conditions, the lower the density, the more AE 200 polymer may be used to form the solid (4 mL of AE 200 polymer for D=10 vs. 2 mL AE 200 polymer for D=16, that is 50% decrease in volume).

It was observed that the solid forms using the mud with density of 16 was noticeably thicker and stronger than the However, there was no observed difference when the pH was changed from 9 to 11.

EXAMPLE 5

Salinity of the muds from EXAMPLE 4 were tested. It was observed that salinity had a greater effect on the performance of AE 200 polymer than pH. Table VII shows the salinity results.

TABLE VII

How Salinity Affects the Performance of AE 200 Polymer

| | Freshwater | 10% (w/w) NaCl | 24% (w/w) NaCl |
|---|---|---|---|
| Density, (lb/gal) | 13 | 13 | 13 |
| Mud vol. (mL) | 10 | 10 | 10 |
| pH | 9.03 | 9.05 | 9.06 |
| AE 200 polymer (mL) | 1 | 2 | 3 |
| Observations | It needs only 1 mL AE 200 polymer to form polymer paste/solid. The texture of the paste is also the best among all other samples. | The texture and strength of the solid is between freshwater and 24% (w/w) NaCl. | AE 200 polymer still works in 24% NaCl (w/w) mud. It just needs more AE 200 polymer to form solid/paste. |

The freshwater mud from Table VII performed the best in terms of the amount of AE 200 polymer used, and the quality of the solid forms after mixing. Again, with more cations in the solution, more AE 200 polymer was needed to form the solid. Therefore, the increasing amount of AE 200 polymer used when the salinity increases can be seen in Table VII. In order to find out if the presence of KCl would affect the performance of AE 200 polymer, two experiments were done with the results shown in Table VIII.

TABLE VIII

| Sample | 10% KCl | 3% KCl + 24% NaCl |
|---|---|---|
| AE 200 polymer (3 mL):Salt Solution (10 mL) | Forms solid | Forms solid |

The results show that there are no problems forming solid whether it is in 10% KCl solution or 24% NaCl with 3% KCl solution, as long as there is enough AE 200 polymer in the mixture (in this case, 3 mL AE 200 polymer).

EXAMPLE 6

AD 200 polymer was tested with various muds, and the results are shown in Table IX. AD 200 polymer is the dehydrated form of AE 200 polymer. The test method here is similar to the test noted above. 1 mL of AD 200 polymer and 20 mL of mud were mixed in a beaker. The time it took for the mixture to harden was recorded. The texture of the solid pastes were compared.

TABLE IX

AD 200 polymer with Various Water Based Muds

| Sample | 1:20(v/v) (AD 200 polymer: Mud) |
|---|---|
| HYDRO-GUARD system | Thicken and form polymer solid within 1 min. |
| Lignosulfonate Mud | Thicken and form polymer solid within 1 min. |
| Lignosulfonate Mud with 6 ppb Lime | Thicken and form polymer solid within 1 min. |
| Lignosulfonate Mud with 6 ppb Lime (0.5 g of Na$_2$CO$_3$ was added before adding AD 200 polymer) | Thicken and form polymer solid within 1 min. However, the time required to form a polymer solid for this mud is shorter than the one from above. The strength and texture of the polymer solid are also better than the one obtained from above. |
| GEM GP Mud | Thicken and form polymer solid within 1 min. |

HYDRO-GUARD system is a mud that is commercially available from Halliburton Energy Services, Inc. and is a water-based mud. GEM GP (general purpose) is a glycol enhanced mud that is commercially available from Halliburton Energy Services, Inc. and is also a water-based mud. It was observed that AD 200 polymer worked very well with different water-based muds. In addition, it was observed that there was no problem forming a solid even with high lime mud. The result is even better when soda ash was added to the high lime mud before adding AD 200 polymer.

EXAMPLE 7

In order to find a safe way to deliver AD 200 polymer down hole, an appropriated spacer for the job was used. Table X summarized the results of such finding. AD 200 polymer in a mud was tested with an emulsifier (e.g., LE SUPERMUL emulsifier), which was used as the spacer. The results of the tests are shown in Table X.

TABLE X

Wetting Agent, Spacer, Mud, AD 200 polymer and their Compatibility and Stability

| Sample | Comments |
|---|---|
| LE SUPERMUL emulsifier | Wetting agent (polyaminated fatty acid) |
| SF Base oil | Main component of the spacer |
| 2%(v/v) LE SUPERMUL emulsifier in SF Base oil | Spacers will be used in water mud systems. It should be used before and after delivering AD 200 polymer down hole. |
| Spacer:AD 200 polymer (10 mL:10 mL) | No problems on stability or compatibility. It takes 25 mL of water to invert the emulsion. |
| Lignosulfonate Mud:Spacer:AD 200 polymer (1:1:0.5) | No problem forming polymer solids. |
| GEM GP Mud:Spacer:AD 200 polymer (1:1:0.5) | No problem forming polymer solids. |

SF Base oil is an internal olefin available from Halliburton Energy Services, Inc. It was observed that no problem occurred when AD 200 polymer was weighted up to 19 lb/gal with barite.

EXAMPLE 8

AD 200 polymer was tested with ACCOLADE drilling fluid. ACCOLADE fluid is a clay-free synthetic based drilling fluid that is commercially available from Halliburton Energy Services, Inc. The formulation of the mud is listed in Table XI. Table XII shows results of different mixes of AD 200 polymer with the ACCOLADE fluid. The ACCOLADE fluid was formulated as in Table XI and then hot rolled at 150° F. in an oven for 16 hours. ADAPTA filtration reducer is a copolymer that provides HPHT filtration control in non-aqueous fluid systems that is commercially available from Halliburton Energy Services, Inc. BARACARB bridging agent is carbonate particles commercially available from Halliburton Energy Services, Inc. RHEMOD L viscosifier is commercially available from Halliburton Energy Services, Inc.

TABLE XI

ACCOLADE Mud Formulation.

| Sample, (lb/gal) | (12.0 lb/gal) 70/30 Oil:Water |
|---|---|
| Water phase salinity | 250,000 ppm |
| ACCOLADE fluid base, bbl | 0.436 |
| LE SUPERMUL emulsifier, lb/bbl | 10 |
| Water, bbl | 0.24 |
| Lime, lb/bbl | 1 |
| ADAPTA HP filtration reducer, lb/bbl | 2 |
| Barite, lb/bbl | 188.96 |
| REV-DUST additive, lb/bbl | 20.0 |
| BARACARB 25 agent, lb/bbl | 7.5 |
| BARACARB 50 agent, lb/bbl | 7.5 |
| $CaCl_2$, lb/bbl | 29.09 |
| RHEMOD L suspension agent/viscosifier, lb/bbl | 1 |

TABLE XII

Preliminary Lab Test Results of AD 200 polymer with ACCOLADE Mud

| Sample | 0.1 g of $Na_2CO_3$ in Different Amount of Water (mL) | | | | 1.0 g $Na_2CO_3$ in Water (mL) |
|---|---|---|---|---|---|
| AD 200 polymer:Mud (2 mL:1 mL) | 5 | 10 | 15 | 20 | 10 |
| Observations | Solid forms in less than 1 min. | Solid forms in less than 1 min. | Solid forms in less than 1 min. | Solid forms in 1 min. | No solid form for at least 3 hrs. After overnight, a paste forms, but it is not as thick as using 0.1 g of $Na_2CO_3$ in 10 mL water. |

It was observed that 1 mL of AD 200 polymer mixed with 20 mL of mud and was able to form a solid/paste mixture. It was also observed that a 2:1 (AD 200 polymer:mud) mixing ratio, plus 20 mL of soda ash solution was used to form the solid/paste as shown in Table XII. When 2 mL of AD 200 polymer was mixed with 1 mL of mud, the concentration of AD 200 polymer changed from 50% to 33.33% (e.g., 33% active AD 200 polymer reacted with 20 mL of soda ash solution to form a solid). The amount of $Na_2CO_3$ used (0.1 g) was calculated based on the stoichiometric amount of $Ca^{2+}$ in the solution. 1.0 g of $Na_2CO_3$ was used instead of 0.1 g to observe whether excess $Na_2CO_3$ affected the performance of AD 200 polymer. Excess $Na_2CO_3$ functioned as salt poisoning for AD 200 polymer, therefore the mixture had a harder time forming the solid.

It was observed that the texture of the solids from the oil mud was not as good as the water-based mud. Therefore, additional solid was added as shown in Table XIII. STEEL SEAL is a graphite that is commercially available form Halliburton Energy Services, Inc.

TABLE XIII

Preliminary Lab Test Results of AD 200 polymer with ACCOLADE Mud

| Sample | 0.1 g of $Na_2CO_3$ in 10 mL Water | | |
|---|---|---|---|
| AD 200 polymer:Mud (2 mL:1 mL) | 3.0 g Barite | 3.0 g REV-DUST additive | 3.0 g STEEL SEAL lost circulation additive |
| Observations | Solid forms in less than 1 min for both cases. REV-DUST additive may be slightly better although no differences were observed on the texture of the solid between barite and REV-DUST additive. | | Solid forms in less than 1 min. The texture of the solid is the best of the three. |

It was observed that the added solid provided a better final paste both on the texture and the strength.

EXAMPLE 9

Two more oil-based muds were tested with AD 200 polymer (PETROFREE SF fluid and ENVIROMUL fluid). PETROFREE drilling fluid is commercially available from Halliburton Energy Services, Inc. ENVIROMUL drilling fluid is commercially available from Halliburton Energy Services, Inc. Their formulations are shown in Tables XIV and XV. GELTONE II viscosifier and GELTONE V viscosifier are gelling and viscosifying agents comprising ground organophillic clay, which are available from Halliburton Energy Services, Inc. Both muds were hot rolled in a 150° F. oven for 16 hrs. ESCAID fluid is an oil that is commercially available from Exxon Chemical Company. SUSPENTONE suspension agent is an organophilic clay commercially available from Halliburton Energy Services, Inc. EZ MUL NT emulsifier is a synthetic-based mud emulsifier commercially available from Halliburton Energy Services, Inc. DURATONE HT (high temperature) oil mud filtration control agent comprises an organophillic lignite blend and is commercially available from Halliburton Energy Services, Inc. DEEP-TREAT thinner is a wetting agent commercially available from Halliburton Energy Services, Inc., and COLDTROL thinner is commercially available from Halliburton Energy Services, Inc. The tests involved adding 20 mL water to a beaker, followed by $Na_2CO_3$. STEELSEAL additive, barite or REV-DUST additive were also added if needed. 2 mL of AD 200 polymer and 1 mL of mud were then added to the beaker. The contents of the beaker were then mixed. The time needed for the mixture to harden was recorded. The results of the tests are shown in Table XVI.

TABLE XIV

PETROFREE SF Mud Formulation.

| Sample, (lb/gal) | (12.0 lb/gal) 70/30 Oil:Water |
|---|---|
| Water phase salinity | 250,000 ppm |
| SF Base (IO), bbl | 0.426 |
| LE SUPERMUL emulsifier, lb/bbl | 8 |
| ADAPTA HP filtration reducer, lb/bbl | 1 |
| Water, bbl | 0.257 |
| RHEMOD L suspension agent/viscosifier | 0.25 |
| Barite, lb/bbl | 208.1 |
| $CaCl_2$, lb/bbl | 29.11 |
| REV-DUST additive, lb/bbl | 10.0 |
| BARACARB 5 agent, lb/bbl | 10.0 |
| GELTONE II viscosifier, lb/bbl | 4.0 |

TABLE XV

ENVIROMUL Mud Formulation.

| Sample, (lb/gal) | (12.0 lb/gal) 70/30 Oil:Water |
|---|---|
| Water phase salinity | 250,000 ppm |
| ESCAID fluid 110, bbl | 0.524 |
| Water, bbl | 0.233 |
| GELTONE V viscosifier, lb/bbl | 12.0 |
| SUSPENTONE agent, lb/bbl | 4.0 |
| EZ MUL NT emulsifier, lb/bbl | 5.0 |
| INVERMUL NT emulsifier, lb/bbl | 4.0 |
| Lime, lb/bbl | 2 |
| DURATONE HT filtration control agent | 8.0 |
| DEEP-TREAT thinner, lb/bbl | 5.0 |
| COLDTROL thinner, lb/bbl | 2.5 |
| $CaCl_2$, lb/bbl | 28.4 |
| Barite, lb/bbl | 209.8 |

TABLE XVI

Test Results of AD 200 polymer with PETROFREE SF and ENVIROMUL Mud

| Sample | 0.1 g $Na_2CO_3$* | 1.0 g $Na_2CO_3$ | 0.1 g $Na_2CO_3$ and 3 g STEELSEAL material | 0.1 g $Na_2CO_3$ and 3 g barite | 0.1 g $Na_2CO_3$ and 3 g REV-DUST additive |
|---|---|---|---|---|---|
| AD 200 polymer:PETROFREE mud SF (2:1) | Solid forms in 1.5 min | Solid forms in 15 min | Solid forms in 1.5 min. The texture and the strength of the paste are better than without adding any solid. The ones with STEELSEAL material and REV-DUST additive look better than barite. | | |
| AD 200 polymer:ENVIROMUL mud (2:1) | Solid forms in 1 min | Solid forms in 5 min | Solid forms in 1 min. The texture and the strength of the paste are better than without adding any solid. The one with STEELSEAL material looks the best. | | |

*All experiments in this table are done with 20 mL of water.

From EXAMPLES 8 and 9, it can be seen that the tests results of AD 200 polymer with PETROFREE SF and ENVIROMUL muds are similar to ACCOLADE mud.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Background of the Invention is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore that penetrates a subterranean formation comprising:
    placing a sealant composition comprising an inverse emulsion polymer into the wellbore at a pressure insufficient to initiate or extend a fracture within the subterranean formation to reduce a loss of fluid to the subterranean formation during placement of the fluid in the wellbore, wherein the inverse emulsion polymer comprises from about 10 wt. % to about 80 wt. % oil by total weight of the inverse emulsion polymer, wherein the inverse emulsion polymer comprises from about 0 wt. % to about 70 wt. % water by total weight of the inverse emulsion polymer, wherein the inverse emulsion polymer has a pH of from about 5.1 to about 8, and wherein the inverse emulsion polymer is dehydrated prior to placement in the wellbore to comprise from about 0 wt. % to about 10 wt. % water.

2. The method of claim 1, wherein the inverse emulsion polymer comprises a petroleum oil, a natural oil, a synthetically derived oil, a mineral oil, a silicone oil, or combinations thereof.

3. The method of claim 1, wherein the inverse emulsion polymer comprises a water swellable polymer.

4. The method of claim 3, wherein the inverse emulsion polymer comprises from about 5 wt. % to about 90 wt. % water swellable polymer by total weight of the inverse emulsion polymer.

5. The method of claim 3, wherein the water swellable polymer comprises a synthetic polymer, a superabsorber, a natural polymer, or combinations thereof.

6. The method of claim 3, wherein the water swellable polymer comprises particles having particle sizes from about 0.01 microns to about 30 microns.

7. The method of claim 1, further comprising placing a spacer fluid into the wellbore prior to placement of the sealant composition.

8. The method of claim 1, further comprising placing a drilling fluid into the wellbore after placement of the sealant composition in the wellbore.

9. The method of claim 1, wherein the fluid comprises a water-based drilling fluid or a nonaqueous drilling fluid.

10. The method of claim 1, further comprising placing a treating composition in the wellbore after placement of the sealant composition in the wellbore.

11. A method of servicing a wellbore that penetrates a subterranean formation comprising:
    placing a sealant composition comprising an inverse emulsion polymer into the wellbore at a pressure insufficient to initiate or extend a fracture within the subterranean formation to reduce a loss of fluid to the subterranean formation during placement of the fluid in the wellbore, wherein the inverse emulsion polymer is dehydrated before placement in the wellbore, wherein the inverse emulsion polymer is dehydrated to comprise from about 0 wt. % to about 10 wt. % water and wherein the inverse emulsion polymer has a pH of from about 5.1 to about 8.

12. A method of servicing a wellbore that penetrates a subterranean formation comprising:
    placing a sealant composition comprising an inverse emulsion polymer into the wellbore at a pressure insufficient to initiate or extend a fracture within the subterranean formation to reduce a loss of fluid to the subterranean formation during placement of the fluid in the wellbore and adding a weighting material to the inverse emulsion polymer prior to placement of the inverse emulsion polymer in the wellbore, wherein the inverse emulsion polymer has a pH of from about 5.1 to about 8.0, and wherein the inverse emulsion polymer is dehydrated prior to placement in the wellbore to comprise from about 0 wt. % to about 10 wt. % water.

13. A method of servicing a wellbore that penetrates a subterranean formation comprising:
    placing a sealant composition comprising an inverse emulsion polymer into the wellbore at a pressure insufficient to initiate or extend a fracture within the subterranean formation to reduce a loss of fluid to the subterranean formation during placement of the fluid in the wellbore, wherein the inverse emulsion polymer comprises from about 30 wt. % to about 70 wt. % oil by total weight of the inverse emulsion polymer, wherein the inverse emulsion polymer is dehydrated to comprise from about 0 wt. % to about 10 wt. % water before placement in the wellbore, and wherein the inverse emulsion polymer has a density of from about 1.0 g/ml to about 2.5 g/ml.

* * * * *